No. 690,709. Patented Jan. 7, 1902.
G. A. ENSIGN.
AXLE SHAPING MACHINE.
(Application filed Apr. 9, 1901.)

(No Model.) 9 Sheets—Sheet 1.

WITNESSES:
Edward Thorpe

INVENTOR
George A. Ensign
BY
ATTORNEYS

No. 690,709. Patented Jan. 7, 1902.
G. A. ENSIGN.
AXLE SHAPING MACHINE.
(Application filed Apr. 9, 1901.)
(No Model.) 9 Sheets—Sheet 5.

WITNESSES:
Edward Thorpe
Theo. G. Hoster

INVENTOR
George A. Ensign
BY
ATTORNEYS

THE NORRIS PETERS CO., PHOTO-LITHO., WASHINGTON, D. C.

No. 690,709. Patented Jan. 7, 1902.
G. A. ENSIGN.
AXLE SHAPING MACHINE.
(Application filed Apr. 9, 1901.)
(No Model.) 9 Sheets—Sheet 6.

WITNESSES:
Edward Thorpe

INVENTOR
George A. Ensign
BY
ATTORNEYS

No. 690,709. Patented Jan. 7, 1902.
G. A. ENSIGN.
AXLE SHAPING MACHINE.
(Application filed Apr. 9, 1901.)
(No Model.) 9 Sheets—Sheet 7.

WITNESSES: Edw. Thorpe

INVENTOR
George A. Ensign.
BY
ATTORNEYS

THE NORRIS PETERS CO., PHOTO-LITHO., WASHINGTON, D. C.

No. 690,709. Patented Jan. 7, 1902.
G. A. ENSIGN.
AXLE SHAPING MACHINE.
(Application filed Apr. 9, 1901.)
(No Model.) 9 Sheets—Sheet 8.

WITNESSES:
Edward Thorpe

INVENTOR
George A. Ensign
BY
ATTORNEYS

No. 690,709. Patented Jan. 7, 1902.
G. A. ENSIGN.
AXLE SHAPING MACHINE.
(Application filed Apr. 9, 1901.)
(No Model.) 9 Sheets—Sheet 9.

WITNESSES:
Edw. Thorpe

INVENTOR
George A. Ensign
BY
ATTORNEYS

UNITED STATES PATENT OFFICE.

GEORGE A. ENSIGN, OF DEFIANCE, OHIO, ASSIGNOR TO THE DEFIANCE MACHINE WORKS, OF DEFIANCE, OHIO, A CORPORATION OF OHIO.

AXLE-SHAPING MACHINE.

SPECIFICATION forming part of Letters Patent No. 690,709, dated January 7, 1902.

Application filed April 9, 1901. Serial No. 55,022. (No model.)

*To all whom it may concern:*

Be it known that I, GEORGE A. ENSIGN, a citizen of the United States, and a resident of Defiance, in the county of Defiance and State of Ohio, have invented a new and Improved Axle-Shaping Machine, of which the following is a full, clear, and exact description.

The invention relates to woodworking-machines such as are used for shaping the ends of a wooden axle to fit a metallic skein.

The object of the invention is to provide a new and improved axle-shaping machine, more especially designed for the use of wagon and truck builders, for turning the ends of wooden axles to the proper size and shape and for fitting the interior of either large or small metallic axle-skeins, the machine being arranged to give the desired gather to the axle ends and to prevent a tendency to twist or spring the bed out of alinement, to insure an uncramped movement of the working parts, and thereby increase the capacity of the machine and raise the quality of the work.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
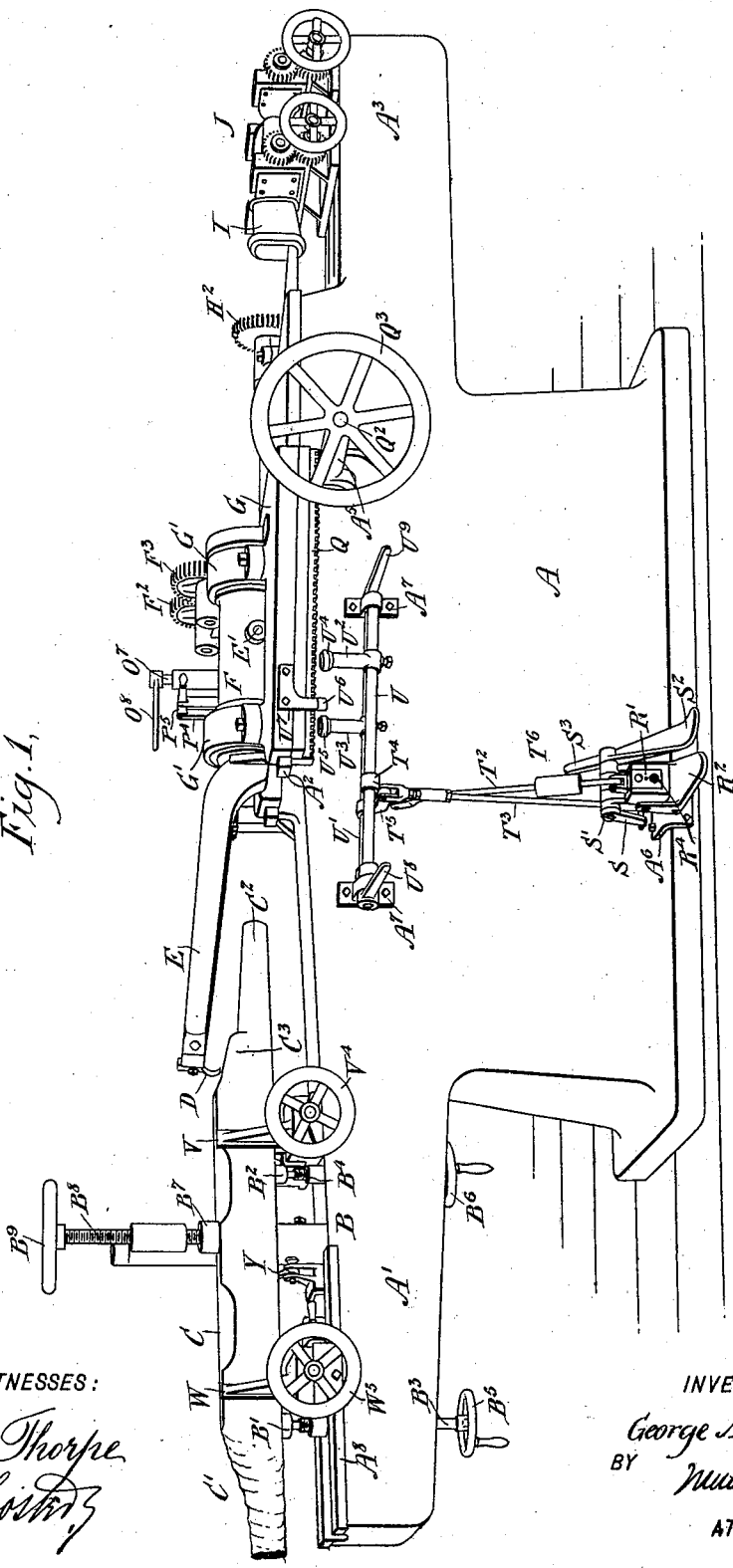
Figure 2:
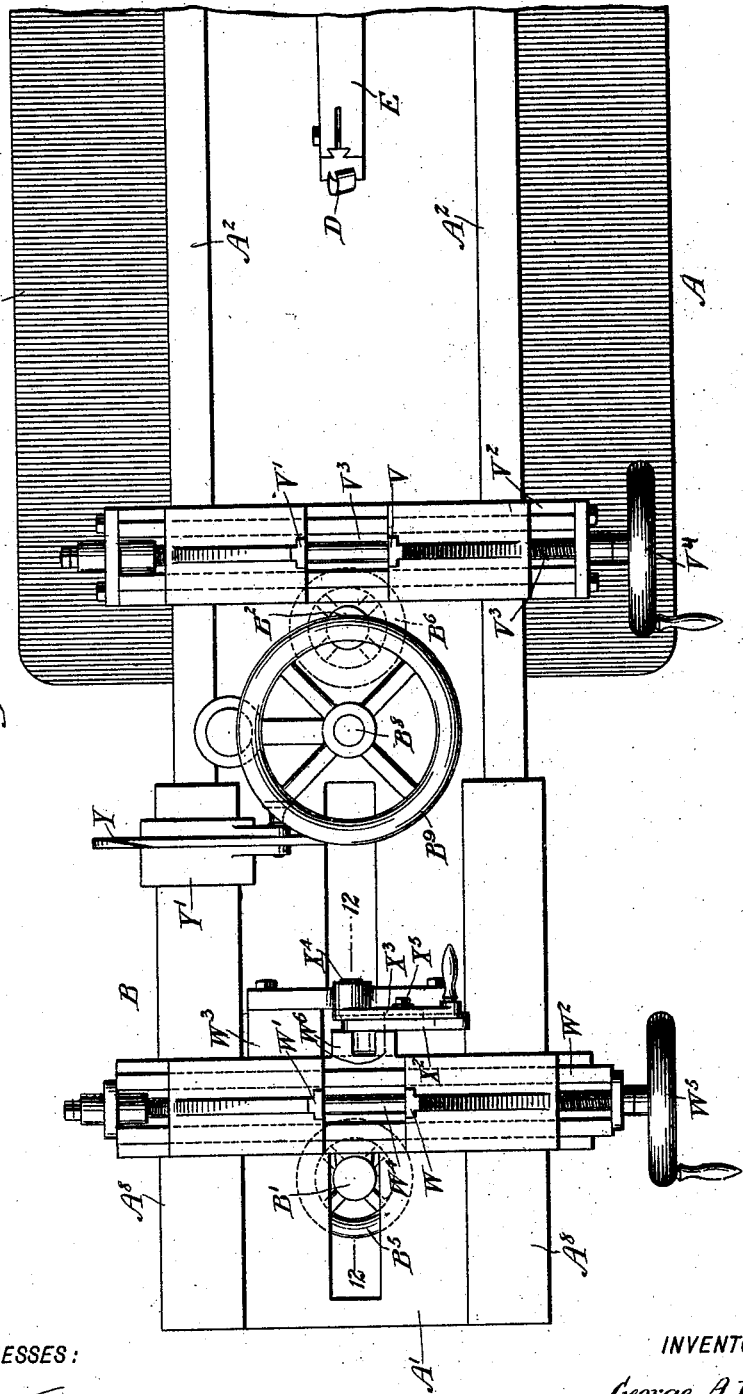
Figure 3:
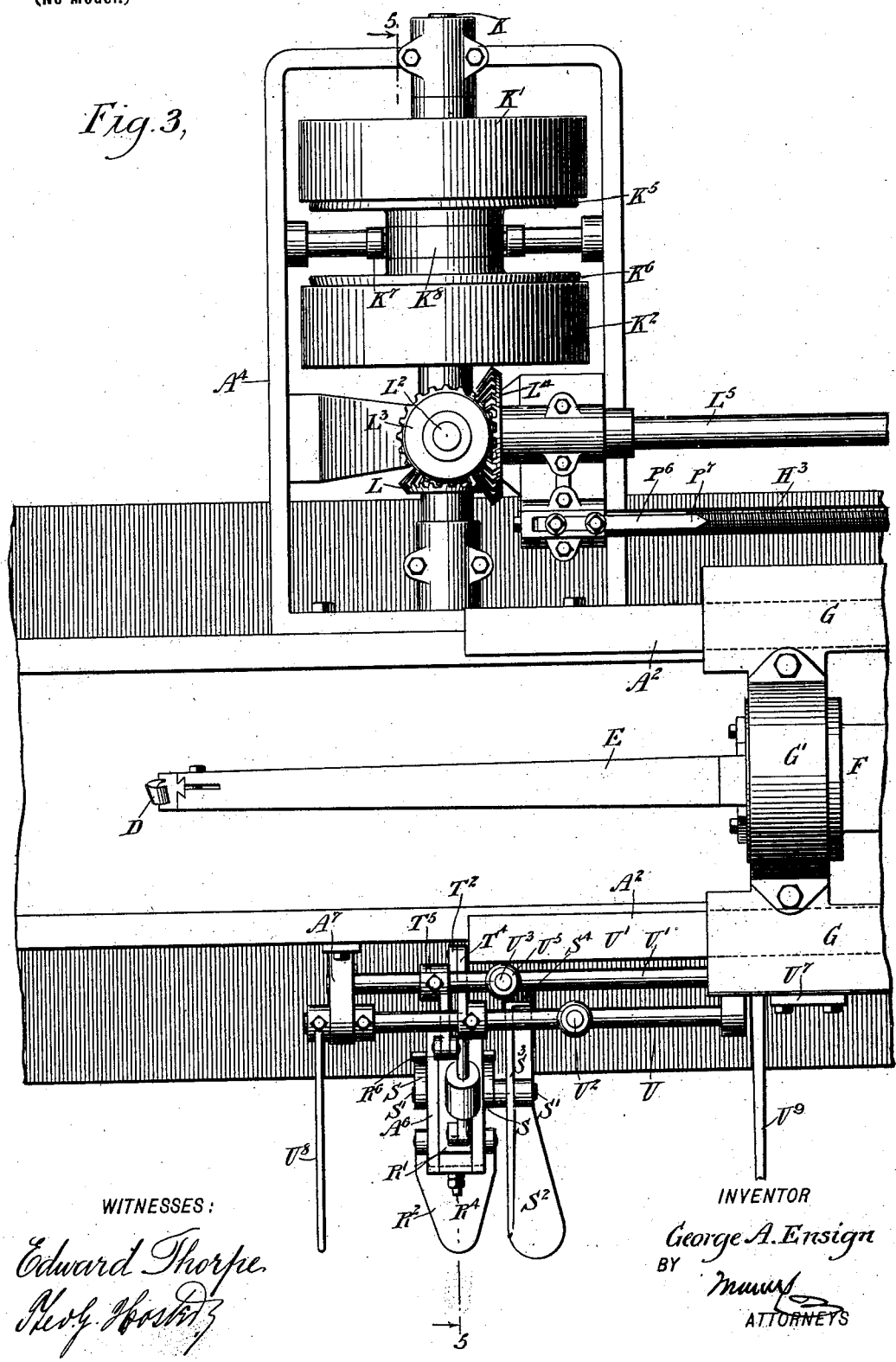
Figure 4:
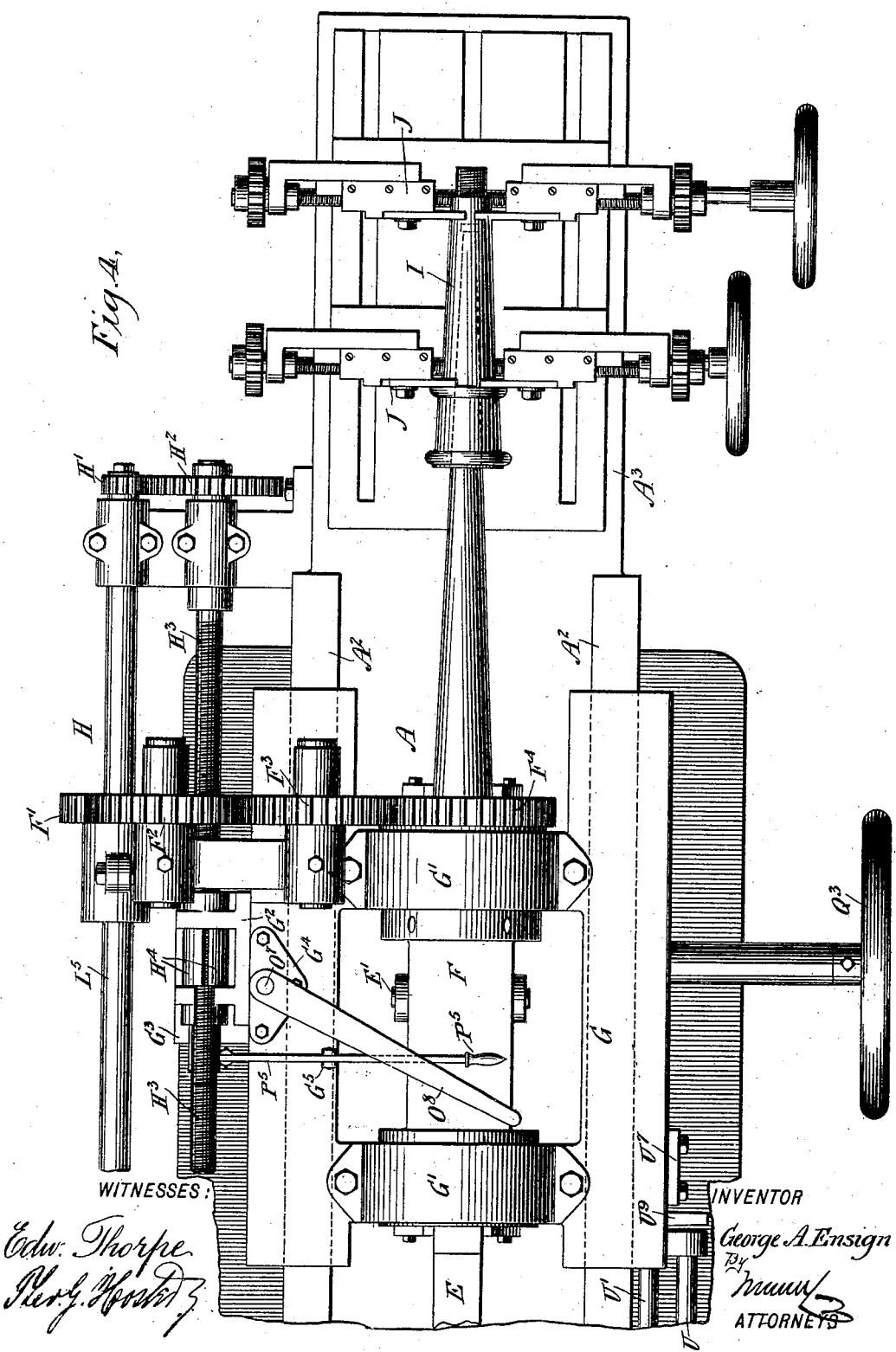
Figure 5:
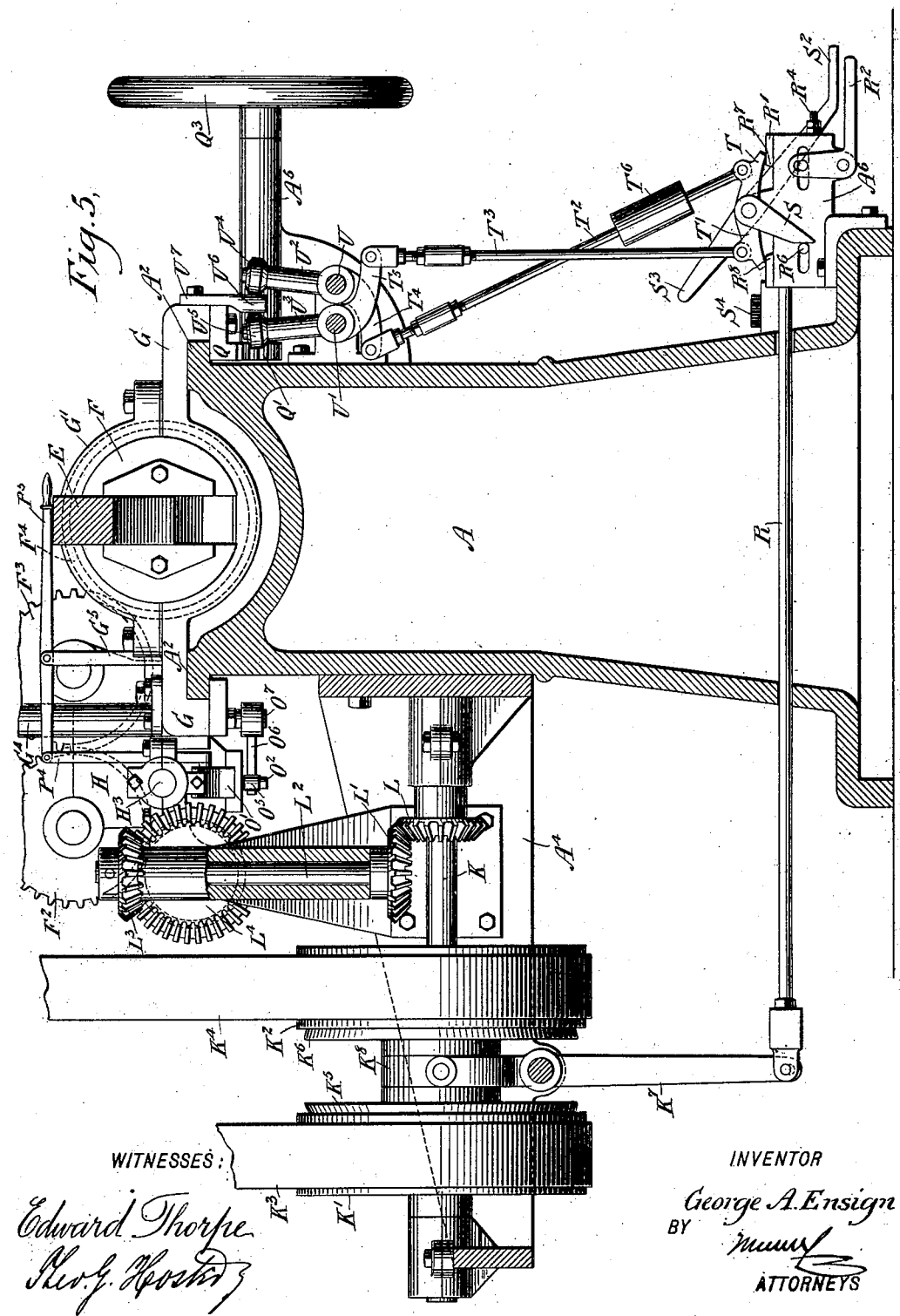
Figure 6:
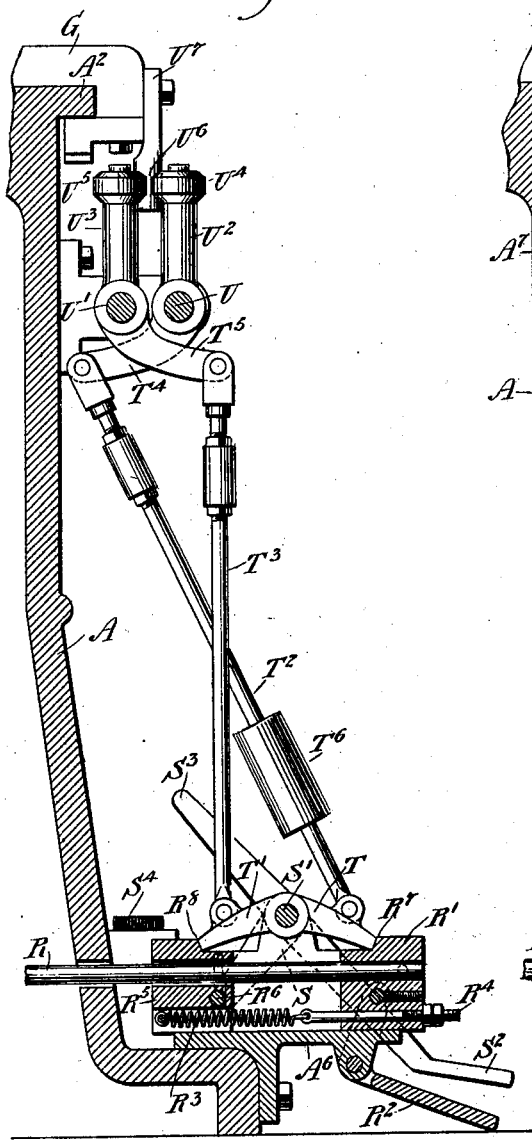
Figure 7:
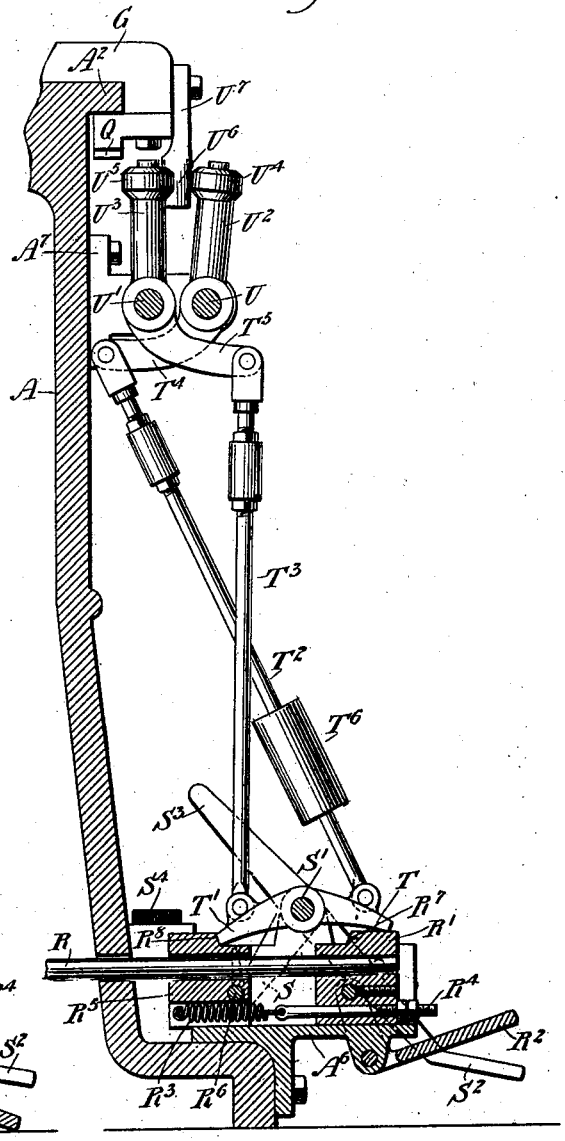
Figure 8:
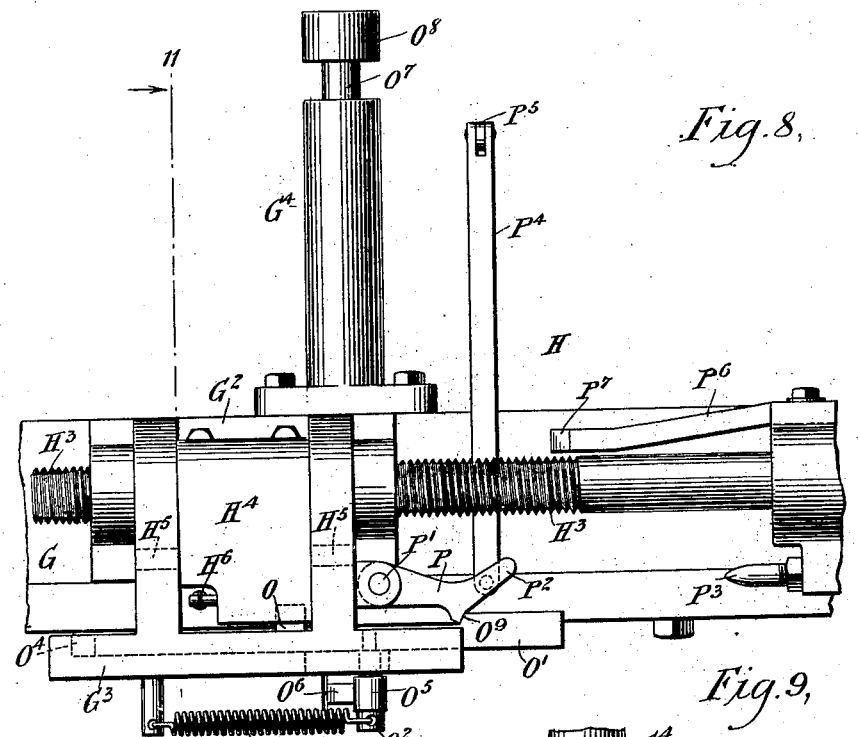
Figure 9:
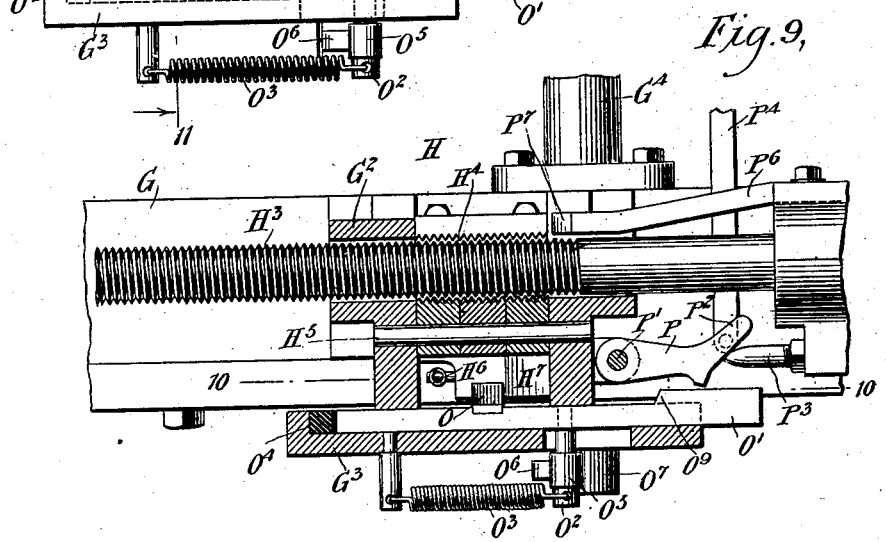
Figure 10:
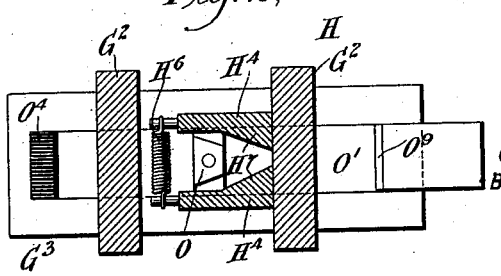
Figure 11:
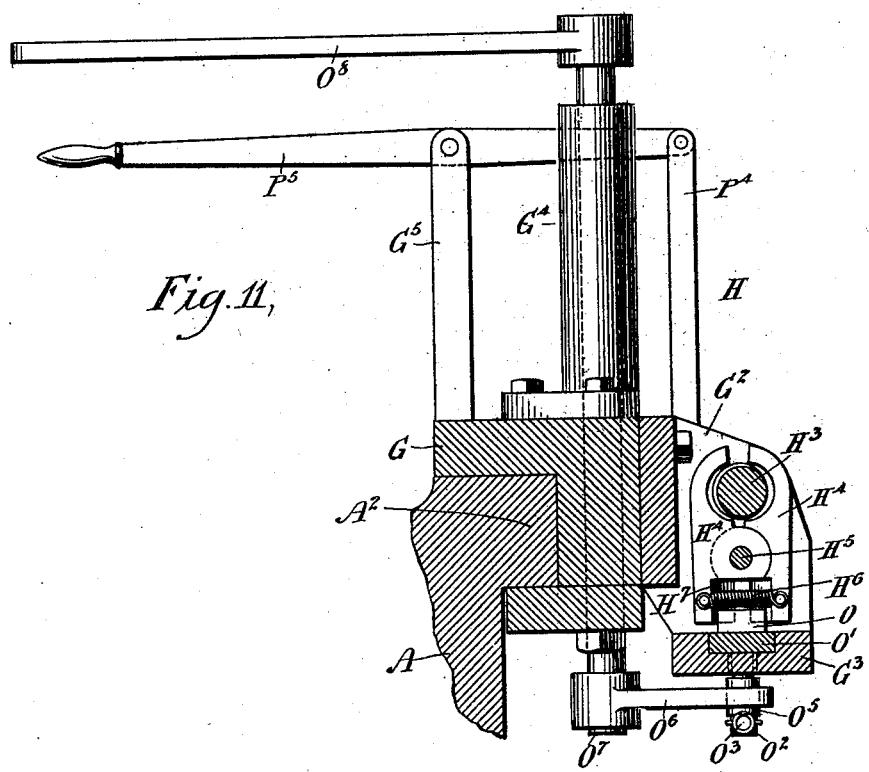
Figure 12:
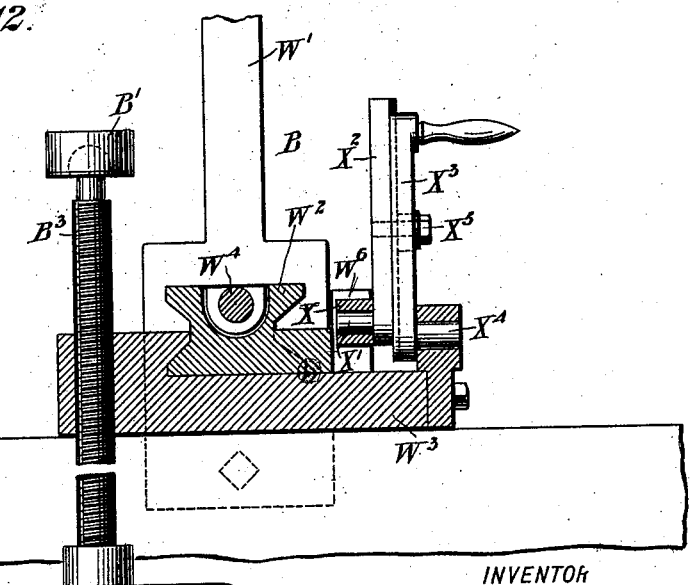
Figure 13:
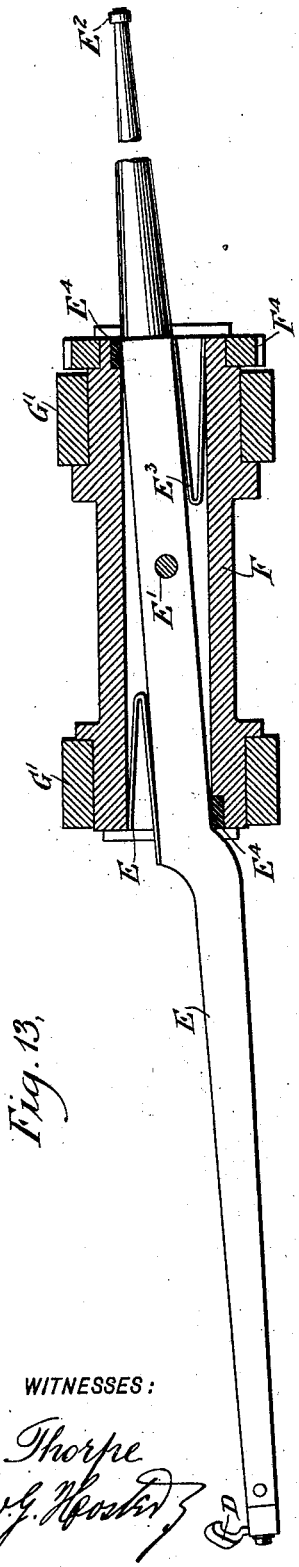
Figure 14:
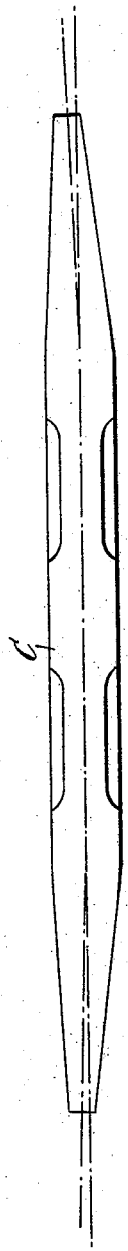

Figure 1 is a perspective view of the improvement. Fig. 2 is a plan view of the forward end of the improvement, showing the axle-support and the forward end of the cutter-bar. Fig. 3 is a similar view of the central portion of the machine, showing the cutter-bar, its carriage, the differential speed-gear, and the shifting mechanism for the same. Fig. 4 is a like view of the rear end of the improvement, showing the carriage for the cutter-bar, the carriage-feed, and the skein-supporting device. Fig. 5 is a transverse section of the central portion of the machine, the section being on the line 5 5 in Fig. 3. Fig. 6 is an enlarged transverse section of the shifting mechanism for the differential speed-gear. Fig. 7 is a similar view of the same with parts in a different position. Fig. 8 is an enlarged rear elevation of the carriage-feed mechanism. Fig. 9 is a longitudinal sectional elevation of the same. Fig. 10 is a sectional plan view of the same on the line 10 10 in Fig. 9. Fig. 11 is a transverse section of the same on the line 11 11 in Fig. 8. Fig. 12 is an enlarged longitudinal sectional elevation of part of the axle-support, the section being on the line 12 12 in Fig 2. Fig. 13 is a longitudinal sectional elevation of the carriage, the cutter-bar bearing, and the cutter-bar; and Fig. 14 is a plan view of the axle.

On the forward end $A'$ of a suitably-constructed bed A is arranged an axle-support B for carrying a wooden axle C, the rough ends $C'$ of which are cut and shaped into the desired form by a cutter D, held on the forward end of a cutter-bar E, fulcrumed on a pivot-pin $E'$, arranged in a carrier F, mounted to turn in bearings $G'$, forming part of a carriage G, held to slide longitudinally on suitable guideways $A^2$, secured to or formed on the top of the bed A, said carriage G being automatically fed forward by a feed mechanism H and quickly returned by hand, as hereinafter more fully described. The cutter-bar E extends through the carrier F and carries at its rear end a friction-roller $E^2$, adapted to travel on the inside of the skein I, held on a skein-support J, carried by the rear end $A^3$ of the bed A, the said skein forming the pattern or former for shaping the ends of the axle correspondingly for the ends to accurately fit the skein.

The carrier F and the feed mechanism H are driven from the main shaft K, (see Figs. 3 and 5,) journaled in suitable bearings carried on a bracket $A^4$, attached to the rear of the frame A, and on said shaft K are mounted to turn loosely pulleys $K'$ $K^2$, of which the pulley $K'$ is connected by a belt $K^3$ with a large pulley on a counter-shaft, (not shown,) and the other pulley $K^2$ is connected by a belt $K^4$ with a small pulley on said counter-shaft, so that when the latter is rotated the pulley $K'$ is rotated at a higher rate of speed than the pulley $K^2$. The pulleys $K'$ $K^2$ are adapted to be engaged by friction-clutches $K^5$ $K^6$, connected with each other and mounted to slide on and to turn with the shaft K, a shifting lever $K^7$ engaging the hub $K^8$, common to the said clutches $K^5$ and $K^6$, to move either of the latter into frictional engagement with the corresponding pulley $K'$ or $K^2$ to rotate the shaft $K$ at a high rate of speed during the time the cutter $D$ cuts the conical end $C^2$ of the axle $C$, or to rotate the shaft $K$ at a low rate of speed during the time the cutter $D$ forms the oblong portion $C^3$ of the axle. When the lever $K^7$ is in a central position, as shown in Fig. 5, then both clutches $K^5 K^6$ are out of frictional engagement with their pulleys $K' K^2$, and the shaft $K$ is now at a standstill.

On the shaft $K$ are secured a bevel gear-wheel $L$, in mesh with a bevel gear-wheel $L'$, secured on the lower end of a vertically-disposed shaft $L^2$, journaled in suitable bearings carried by the bracket $A^4$. On the upper end of the shaft $L^2$ is secured a bevel-pinion $L^3$, in mesh with a bevel gear-wheel $L^4$, fastened on the forward end of a shaft $L^5$, extending longitudinally at the rear of the bed $A$ and mounted to turn in suitable bearings carried by said bed $A$. Near the rear end of the shaft $L^5$ (see Fig. 4) is secured a gear-wheel $F'$, in mesh with an intermediate gear-wheel $F^2$, meshing with a second intermediate gear-wheel $F^3$, in mesh with a gear-wheel $F^4$, secured on the carrier $F$, so that when the shaft $L^5$ is rotated said gear-wheels $F' F^2 F^3 F^4$ are rotated to rotate the carrier $F$, and with it the cutter-bar $E$, to cause the cutter $D$ to cut the end of the axle and first form the conical portion $C^2$ and then the oblong portion $C^3$, according to the shape of the skein.

On the rear end of the shaft $L^5$ is secured a pinion $H'$, in mesh with a gear-wheel $H^2$, secured on the rear end of the feed-screw $H^3$, forming part of the feed mechanism $H$ and mounted to turn in suitable bearings carried by the bed $A$ and its bracket $A^3$. (See Figs. 3 and 4.) The feed-nut $H^4$ for engaging the feed-screw $H^3$ is made in two parts pivoted on a pin $H^5$, journaled in a bracket $G^2$, attached to the carriage $G$, (see Figs. 8, 9, 10, and 11,) and the lower projecting ends of said parts are connected with each other by a transverse spring $H^6$ for normally holding the feed-nut parts out of engagement with the thread on the feed-screw $H^3$. (See Fig. 11.) The lower ends of the feed-nut parts are formed at their inner opposite faces with bevels $H^7$, adapted to be engaged by a double wedge $O$, secured to or formed on the top of a slide $O'$, mounted to move longitudinally in suitable bearings formed in the bottom plate $G^3$ of the bracket $G^2$, and on the said slide $O'$ is secured a depending pin $O^2$, extending through an elongated slot in the said bottom $G^3$ to be engaged at the lower end by one end of a spring $O^3$, secured at its other end to a pin on said bottom $G^3$ to normally hold the slide $O'$ in a rearmost position, the rear end of the slide resting against a rubber cushion $O^4$. On the depending pin $O^2$ is mounted to turn loosely a friction-roller $O^5$, adapted to be engaged by an arm $O^6$, secured to the lower end of a shaft $O^7$, extending vertically and journaled in a suitable bearing $G^4$, attached to the carriage $G$. On the upper end of the shaft $O^7$ is secured a handle $O^8$, extending across the top of the machine to the front thereof, so as to be within convenient reach of the operator.

When the carriage $G$ is in a rearmost position and the operator swings the handle $O^8$ from the left to the right, then the shaft $O^7$ is turned, and the arm $O^6$, pressing on the friction-roller $O^5$, causes the latter, the pin $O^2$, and the slide $O'$ to move forward and force the wedge $O$ between the bevels $H^7$, so that the feed-nut parts of the feed-nut $H^4$ are actuated to close the feed-nut parts upon the thread of the screw $H$, and when the latter rotates the feed-nut is moved forward, and with it the bracket $G^2$ and the carriage $G$. When the slide $O'$ is moved forward, upon the operator moving the handle $O^8$ from the left to the right, as above explained, then a gravity-catch $P$, fulcrumed at $P'$ on the bracket $G^2$, drops upon a shoulder $O^9$ on the top of said slide $O'$ to lock the latter in an outermost position and hold the feed-nut parts in a closed position on the thread of the feed-screw $H^3$.

The catch $P$ is formed at its forward end with a bevel $P^2$, adapted to engage a pin $P^3$, secured on the forward bearing of the feed-shaft $H^3$, so that when the cutter $D$ has finished the oblong portion $C^3$ of the axle $C$ and the carriage $G$ has moved to a corresponding forward position, then the bevel $P^2$ engages the pin $P^3$, and consequently the catch $P$ is swung upward out of engagement with the shoulder $O^9$, so that the spring $O^3$ now immediately draws the slide $O'$ rearwardly and the double wedge $O$ out of engagement with the bevels $H^7$, for the spring $H^6$ to quickly open the feed-nut parts $H^4$ and stop further forward feeding of the carriage $G$ on a further rotation of the screw-rod $H^3$. The operator may cause the feed-nut parts to open at any time during the forward travel of the carriage $G$, and for this purpose the catch $P$ is pivotally connected by a link $P^4$ with a handled lever $P^5$, fulcrumed on a bracket $G^5$, secured to the carriage $G$, as indicated in Fig. 4. The lever $P^5$ extends transversely, and its free end is within reach of the operator, so that when the latter presses the lever $P^5$ downward, an upward swinging motion is given to the catch $P$, so as to disengage the latter from the shoulder $O^9$ and allow the spring $O^3$ to draw the slide $O'$ rearward and release the feed-nut parts, which are now opened by the spring $H^6$, as previously mentioned. Thus the carriage may be brought to a standstill at any time during its forward stroke by the operator manipulating the lever $P^5$ accordingly. In case the feed-nut parts do not open at the proper time, for any reason whatever, then the feed-nut parts $H^4$ are opened by an emergency-bar $P^6$, secured to the forward bearing of the feed-screw $H^3$ and formed at its free end with a double wedge P⁷, adapted to pass between the upper ends of the feed-nut parts, so as to force the same apart and out of engagement with the threads on the feed-screw H³, as will be readily understood by reference to Figs. 3, 4, 8, and 9.

The carriage G is run backward to its rearward or starting position by the operator at the time the feed-nut H⁴ is open, and for this purpose the front of the carriage G is provided with a longitudinally-extending rack Q, in mesh with a pinion Q', (see Fig. 5,) secured on the inner end of a transverse shaft Q², journaled in a bearing in the bracket A⁵, attached to the bed A. On the other end of the shaft Q² is secured a hand-wheel Q³, adapted to be taken hold of and turned by the operator to run the carriage G backward to a starting position whenever desired.

In order to actuate the shifting lever K⁷ for starting the machine by the operator, and in order to automatically shift the double clutch K⁵ K⁶ from the carriage G to run the machine at a lower rate of speed at the time the cutter D has finished the conical end C² and has started on the oblong portion C³, the following shifting device is provided, special reference being had to Figs. 1, 3, 5, 6, and 7.

The shifting lever K⁷ is pivotally connected within the rear end of a rod R, extending transversely through suitable openings in the bed A to connect at the forward end with a block R', mounted to slide transversely in suitable guideways formed in a bracket A⁶, secured to the front of the bed A. This block R' is pivotally connected with a treadle R², fulcrumed on the bracket A⁶ and adapted to be pressed by the operator to slide the block R' into a forward position against the tension of a spring R³, secured at its forward end on a rod R⁴, adjustably held in the block R'. The rear end of the spring R³ is secured to a second block R⁵, likewise mounted to slide in the guideway of the bracket A⁶ in the rear of the block R', and this block R⁵ is provided with a longitudinal pin R⁶, extending through elongated slots in the sides of the guideway of the bracket A⁶, as is plainly shown in Fig. 5, and the outer ends of said pin R⁶ are adapted to be engaged by arms S, secured on a shaft S', mounted to turn in suitable bearings carried on the guideway of the bracket A⁶. A treadle S² is secured on this shaft S' and is under the control of the operator, and said treadle is formed with an extension S³, adapted to rest on a rubber block S⁴, carried by the bracket A⁶ and serving to limit the upward swinging motion of the treadle S². The tops of the blocks R' R⁵ are formed with shoulders R⁷ R⁸, respectively adapted to be engaged by dogs T T', loosely fulcrumed on the shaft S', so that when the operator presses the treadles R² and S² and causes the blocks R' and R⁵ to slide in opposite directions, then the dogs T T' drop and by their free ends engage the shoulders R⁷ R⁸ to lock the blocks R' R⁵ in position against the tension of the spring R³, as is plainly indicated in Fig. 6. The dogs T T' are pivotally connected by upwardly-extending links T² T³ with arms T⁴ T⁵, secured on longitudinally-extending shafts U U', mounted to turn in suitable bearings carried by brackets A⁷, attached to the bed A.

On the shafts U U' are adjustably held upwardly-extending arms U² U³, carrying at their upper ends friction-rollers U⁴ U⁵, adapted to be engaged by a pin U⁶, depending from a bracket U⁷, secured to the front of the carriage G, as is plainly illustrated in Figs. 1 and 5. Now, when the carriage G moves forward the depending pin U⁶ first comes in contact with the friction-roller U⁴ and imparts an outward swinging motion to the arm U² to rock the shaft U, and thereby give an upward swinging motion to the arm T⁴ to cause the link T² to swing the dog T upward out of engagement with the shoulder R⁷, and thereby release the block R', which is now pulled inward by the action of the spring R³. This inward movement of the block R' causes the rod R to impart a swinging motion to the shifting lever K⁷ to move the double clutch out of engagement with the pulley K' and into engagement with the pulley K² to rotate the shaft K at a low rate of speed. The arm U² is so adjusted on the shaft U that the above-described movement takes place at the time the cutter D has finished the conical end C² and starts on the oblong portion C³ of the axle. When the oblong portion of the axle has been finished by the cutter D, then the depending pin U⁶ moves in engagement with the friction-roller U⁵ to swing the arm U³ transversely, and thereby rock the shaft U', so that the arm T⁵ is swung upward and its link T³ imparts an upward swinging motion to the dog T' to release the block R⁵, so that the block R' is relieved from the tension of the spring R³, and the said blocks R' R⁵, the rod R, the lever K⁷, and the friction-clutches K⁵ K⁶ move to a central position, and the clutches K⁵ K⁶ are now out of frictional engagement with the pulleys K' K², so that the shaft K comes to a standstill, and with it the working parts of the machine. In further explanation of the described movement of the clutches to central position it may be stated that when the blocks R' R⁵ are farthest apart, (see Fig. 6,) then the spring R³ is under full tension, and when the dog T disengages from the block R' the spring R³ draws the block R' inward to shift the clutches from one wheel to the other; but the spring R³ still remains under tension. When the block R⁵ is finally released by dog T', then the said block R⁵ moves outward and the spring is relieved of its tension, and consequently the block R' is completely loose, and the block being no longer under tension the friction-clutch K⁵ moves out of engagement with its wheel or pulley K', since there is nothing to hold it in frictional contact. The link T² is provided with a weight T⁶ for holding the dog T securely in a locked position against the shoulder $R^7$ of the block $R'$. The ends of the shafts U U' are provided with handles $U^8 U^9$, adapted to be taken hold of by the operator to enable the latter to turn said shafts whenever desired to actuate the shifting lever $K^7$ and throw the clutches $K^5 K^6$ in or out of mesh with the pulleys $K' K^2$.

The cutter-bar E is pressed on opposite sides by two springs $E^3$, arranged within the carrier F on opposite sides of the pivot-pin $E'$, as is plainly shown in Fig. 13, to allow the cutter-bar to yield according to the movement of the friction-roller $E^2$, traveling on the inside of the skein I. Rubber blocks or cushions $E^4$ are held in the carrier opposite the springs $E^3$ for the cutter-bar to rest on and prevent the cutter-bar from injuring the ends of the carrier.

In order to obtain the desired amount of gather in the ends of the axle C, (see Fig. 14,) the support B is provided with an adjusting device (see Figs. 1, 2, and 12) for throwing the axle into the necessary angular position relatively to the longitudinal axis of the machine. The axle C rests on the supporting-disks $B' B^2$, mounted to turn on the upper ends of screw-rods $B^3 B^4$, carrying at their lower ends hand-wheels $B^5 B^6$, under the control of the operator, for screwing the screw-rods up or down and bringing the supporting-disks $B' B^2$ into proper position and holding the axle C at the desired height. The top of the axle is engaged at its middle by a disk $B^7$, loosely held on the lower end of a screw-rod $B^8$, extending upwardly and working in a bracket attached to the bed A. Said rod is provided with the hand-wheel $B^9$ for use in rotating it for the purpose of clamping the axle firmly. The sides of the axle C forward of the disk $B^2$ are engaged by clamps V V', mounted to slide transversely on a guideway $V^2$, secured to the top of the bed A. The clamps V V' are engaged by right and left hand threads of a screw-rod $V^3$, mounted to turn in suitable bearings on the ends of the guideway $V^2$, and on the outer end of said rod is arranged a hand-wheel $V^4$, under the control of the operator, for turning the said screw-rod and simultaneously moving the clamps V V' against the sides of the axle C or away from the same when it is desired to release the axle. The sides of the axle immediately forward of the disk B' are engaged by similar clamps W W', mounted to slide transversely on guideways $W^2$, mounted to slide transversely on a bed or guideway $W^3$, held longitudinally adjustable on guideways $A^8$, forming part of or being secured to the end A' of the bed A. The clamps W W' are engaged by the right and left hand threads of a screw-rod $W^4$, mounted to turn in bearings arranged in the ends of the guideway $W^2$, and on the outer end of the said screw-rod $W^4$ is secured a hand-wheel $W^5$, adapted to be turned by the operator to move the clamps W W' in engagement with the sides of the axle C or to move the same away from the said sides when it is desired to release the axle. On the guideway $W^2$ are formed spaced lugs $W^6$, between which is mounted to travel a friction-roller X, (see Fig. 12,) journaled on a pin X', secured on the end of an arm $X^2$, which is formed with a lengthwise groove, forming a guideway for an arm $X^3$. The latter has a lateral pin $X^4$, journaled in bearings attached to the adjustable guideway $W^3$. By adjusting—i. e., sliding—the arm $X^2$ on the arm $X^3$ the friction-roller X is moved out of alinement with the pin $X^4$, and when any desired adjustment has thus been made the two arms $X^2$ and $X^3$ are clamped together by means of a bolt $X^5$, that passes through them. The arm $X^3$ is then turned or swung in a vertical plane into the position shown in Fig. 2, so that the friction-roller X in acting on the lugs $W^6$ imparts a transverse sliding motion to the guideway $W^2$, so that the clamps W W' and the screw-rod $W^4$ are moved in the same direction and with them the rear end of the axle. In other words, the angle of the axis of the work with reference to the cutter is changed at will. It is expressly understood that this amount of gather for throwing the end of the axle out of alinement depends on the amount of adjustment between the arms $X^2 X^3$, and it is evident that by adjusting said arms any desired amount of gather may be given to the axle ends.

In order to bring the axle into proper longitudinal position previous to clamping the same in position by the disk $B^7$ on the disks $B' B^2$, a gage Y is provided, pivoted on a frame Y', adjustably held on one of the guideways $A^8$. This gage Y is swung over upon the top of the axle C, and the latter is adjusted longitudinally previously to clamping the same in place until the marked middle of the axle coincides with the point of the gage Y. The skein-support J (shown in the drawings) is of ordinary construction, and hence further description of the same is not deemed necessary.

The operation is as follows: When the axle C has been placed in proper position and secured in place on the support B and the carriage G has been moved into a rearmost starting position, then the operator presses the treadles $R^2 S^2$ to slide the blocks $R' R^5$ in opposite directions and lock the same in place by the dogs T T'. The outward movement of the block R' causes a pull on the rod R, so that the lever $K^7$ is swung to throw the clutch $K^5$ in engagement with the high-speed pulley K', so that the shaft K is now rotated and with it the shaft $L^2$, which in turn drives the screw-shaft $H^3$ and the carrier F. The operator now swings the lever $O^8$ to the right, so that the feed-nut $H^4$ closes and the feed-screw $H^3$ and the carriage G now begin to move forward. The rotary motion of the carrier F carries the cutter-bar E around, and as the friction-roller $E^2$ travels on the inner surface of the skein I as a pattern the said cutter-bar is swung correspondingly on the pivot E' and the cutter D cuts the end of the axle to the shape of the skein. When the cutter D reaches the end of the conical portion C², then the arm U⁷ acts on the friction-roller U⁴ to shift the clutch device, so that the speed of the shafts K and L⁵ and that of the feed-screw H³ and the carriage G is reduced, as above explained. The oblong portion C³ is now formed under reduced speed in the turning and forward movement of the cutter D. When the oblong portion C³ is finished, the nut parts H⁴ automatically release the feed-screw H³, as previously explained, and at the same time the arm U⁷ engages the friction-roller U⁵ to release the dog R⁵ and cause the friction-clutch to assume its normal or central position. The shaft K' now comes to a standstill. The operator now returns the carriage G to a starting position by turning the hand-wheel Q³, and then releases the axle and removes the same from the support B, after which the handled arm X³ is swung over to the other side, and then the axle is replaced on the support, with the untrimmed end next to the cutter D. The axle is now locked in place on the support, and the above-described operation is repeated. It is understood that in order to obtain an even amount of gather in both ends of the axle it is necessary to throw the handled arm X³ over, so that the axle assumes the proper position relatively to the longitudinal axis of the machine, as will be readily understood by reference to Fig. 14.

Having thus fully described my invention, I claim as new and desire to secure by Letters Patent—

1. An axle-shaping machine having a revoluble carrier carrying a cutter-bar, a carriage, a feed mechanism for feeding the carriage, a driving-gear for actuating said feed mechanism and rotating said carrier, and means for controlling said driving-gear, to automatically change the speed of the carriage and that of the carrier during the time the cut is made by the cutter-bar, as set forth.

2. An axle-shaping machine having a revoluble carrier carrying a cutter-bar, a carriage in which the carrier is mounted to turn, a feed mechanism for feeding the carriage forward, a driving-gear for said feed mechanism and said carrier, and means for controlling said driving-gear, to automatically change the speed of the carriage and that of the carrier from a high speed to a low speed during the forward travel of the carriage, as set forth.

3. An axle-shaping machine having a revoluble carrier carrying a cutter-bar, a carriage in which the carrier is mounted to turn, a feed mechanism for feeding the carriage forward, a driving-gear for said feed mechanism and said carrier, and means for controlling said driving-gear, to automatically change the speed of the carriage and that of the carrier from a high speed to a low speed during the forward travel of the carriage, said means being actuated from said carriage, as set forth.

4. An axle-shaping machine having a revoluble carrier carrying a cutter-bar, a carriage in which the carrier is mounted to turn, a feed mechanism for feeding the carriage forward, a driving-gear for said feed mechanism and said carrier, and means for controlling said driving-gear, to automatically change the speed of the carriage and that of the carrier from a high speed to a low speed during the forward travel of the carriage, said means being also under the control of the operator, as set forth.

5. An axle-shaping machine, comprising a carriage mounted to slide, a carrier mounted to turn in said carriage, a feed-screw for said carriage, a shaft geared with said feed-screw and said carrier, and a driving mechanism for said shaft, to rotate the latter at different speeds during the travel of the carriage in one direction, said driving mechanism comprising a drive-shaft geared with said first-mentioned shaft, pulleys loose on the said drive-shaft and driven at different speeds, a double clutch mounted to turn with and to slide on said drive-shaft and adapted to engage either of said pulleys, and means controlled by said carriage, to automatically shift the said double clutch and move it out of engagement with the high-speed pulley, and to move it in engagement with the low-speed pulley during the forward travel of the carriage, as set forth.

6. An axle-shaping machine, comprising a carriage mounted to slide, a carrier mounted to turn in said carriage, a feed-screw for said carriage, a shaft geared with said feed-screw and said carrier, and a driving mechanism for said shaft, to rotate the latter at different speeds during the travel of the carriage in one direction, said driving mechanism comprising a drive-shaft geared with said first-mentioned shaft, pulleys loose on the said drive-shaft and driven at different speeds, a double clutch mounted to turn with and to slide on said drive-shaft and adapted to engage either of said pulleys, and means controlled by said carriage, to automatically shift the said double clutch and move it out of engagement with the high-speed pulley, and to move it in engagement with the low-speed pulley during the forward travel of the carriage, said means also serving to shift the double clutch to a central inactive position when the carriage reaches the end of its stroke, as set forth.

7. A woodworking-machine having a carriage mounted to slide, a driven feed-screw, a feed-nut made in two parts held on a pivot carried by said carriage, a spring for normally holding the feed-nut parts open out of engagement with the feed-screw, a slide on the carriage and under the control of the operator, the slide carrying a wedge for engaging bevels on said feed-nut parts, to close the latter onto said feed-screw, a shaft journaled on said carriage, and having a handle under the control of the operator, and an arm for engaging and shifting the said slide, as set forth.

8. A woodworking-machine having a carriage mounted to slide, a driven feed-screw, a feed-nut made in two parts held on a pivot carried by said carriage, a spring for normally holding the feed-nut parts open out of engagement with the feed-screw, a slide on the carriage and under the control of the operator, the slide carrying a wedge for engaging bevels on said feed-nut parts, to close the latter onto said feed-screw, a spring connected with said slide, means for moving said slide against the tension of said spring, and a catch adapted to engage said slide and lock it in place against the tension of the spring, as set forth.

9. A woodworking-machine having a carriage mounted to slide, a driven feed-screw, a feed-nut made in two parts held on a pivot carried by said carriage, a spring for normally holding the feed-nut parts open out of engagement with the feed-screw, a slide on the carriage and under the control of the operator, the slide carrying a wedge for engaging bevels on said feed-nut parts, to close the latter onto said feed-screw, a spring connected with said slide, means for moving said slide against the tension of said spring, a catch adapted to engage said slide and lock it in place against the tension of the spring, and means for automatically throwing the catch out of engagement with the slide at the time the carriage reaches the end of its forward stroke, as set forth.

10. A woodworking-machine having a carriage mounted to slide, a driven feed-screw, a feed-nut made in two parts held on a pivot carried by said carriage, a spring for normally holding the feed-nut parts open out of engagement with the feed-screw, a slide on the carriage and under the control of the operator, the slide carrying a wedge for engaging bevels on said feed-nut parts, to close the latter onto said feed-screw, a spring connected with said slide, means for moving said slide against the tension of said spring, a catch adapted to engage said slide and lock it in place against the tension of the spring, and means connected with said catch and under the control of the operator and moving with said carriage, to enable the operator to throw the catch out of engagement with the slide at any time during the forward movement of the carriage, as set forth.

11. A machine of the class described having a screw-feed for a carriage, and comprising a feed-screw, a two-part feed-nut on the carriage, a spring for normally holding the parts of the nut open, a device for holding the nut in a closed position on the feed-screw, means for unlocking the said device, to allow the nut to open, and an auxiliary or emergency device for opening the nuts directly in case the spring fails to operate, as set forth.

12. In an axle-shaping machine, the combination, with a suitable horizontal bed, a rotary cutter, and means for operating it, of axle-holding devices, comprising clamps for securing the axle near one end, and the means described for securing and shifting the outer end of the axle, for varying the angle of its axis to that of the said cutter, such means consisting of a bed fixed on the foundation-bed transversely thereof, a guideway adapted to slide on said transverse bed in the direction of the length of the latter, two vertical clamps arranged on said guideway and means for adjusting them toward or from each other as required; means for shifting the guideway consisting of a crank having a fixed pivot, and a bar slidable on said crank lengthwise thereof, and having a pivotal engagement with the aforesaid guideway; and means for clamping the crank and bar in any required adjustment; substantially as shown and described.

13. An axle-shaping machine having a pair of clamps, a screw-rod for moving the clamps toward or from each other, a guideway for the clamps to slide on, a bed for the guideway to slide in a transverse direction, and means for shifting said guideway in said bed, said means comprising two arms adjustable one on the other, and adapted to be fastened together, one of the arms being fulcrumed on the bed and the other on the guideway, as set forth.

14. An axle-shaping machine having a pair of clamps, a screw-rod for moving the clamps toward or from each other, a guideway for the clamps to slide on, a bed for the guideway to slide in a transverse direction, and means for shifting said guideway in said bed, said means comprising two arms slidable one on the other and adapted to be fastened together, a pin on one arm and journaled in said bed, and a friction-roller on the other arm and extending between lugs on the guideway, as set forth.

In testimony whereof I have signed my name to this specification in the presence of two subscribing witnesses.

GEO. A. ENSIGN.

Witnesses:
GEO. W. DEATRICK,
JOSEPH BAUER.